United States Patent
Ito et al.

[11] Patent Number: 6,131,652
[45] Date of Patent: Oct. 17, 2000

[54] AIR CONDITIONING APPARATUS FOR VEHICLE

[75] Inventors: Koichi Ito, Kariya; Hikaru Sugi, Nagoya; Takashi Toyoshima; Kenji Suwa, both of Kariya; Yuichi Shirota, Anjo, all of Japan

[73] Assignee: DENSO Corporation, Kariya, Japan

[21] Appl. No.: 09/123,107

[22] Filed: Jul. 27, 1998

[30] Foreign Application Priority Data

Jul. 30, 1997 [JP] Japan ................................. 9-204731
Aug. 8, 1997 [JP] Japan ................................. 9-215041

[51] Int. Cl.[7] .................................................. F25B 29/00
[52] U.S. Cl. ........................... 165/204; 165/42; 165/43; 165/203; 237/12.3 A; 237/12.3 B; 454/137; 454/139; 454/156; 62/244
[58] Field of Search ............................ 165/41, 42, 43, 165/203, 204; 237/12.3 A, 12.3 B; 454/156, 137, 139; 62/244

[56] References Cited

U.S. PATENT DOCUMENTS

| 4,432,213 | 2/1984 | Katahira et al. .................... 454/137 |
| 4,763,564 | 8/1988 | Czarnecki et al. .................. 454/139 |
| 4,842,046 | 6/1989 | Stech ..................................... 165/42 |
| 4,949,779 | 8/1990 | Kenny et al. ......................... 165/43 |
| 5,054,378 | 10/1991 | Speece ................................. 454/137 |
| 5,116,280 | 5/1992 | Kloster ................................. 454/156 |
| 5,566,881 | 10/1996 | Inoue et al. ...................... 237/12.3 B |
| 5,662,162 | 9/1997 | Fukuoka et al. ..................... 165/41 |
| 5,715,997 | 2/1998 | Ito et al. ................................ 165/43 |
| 5,803,166 | 9/1998 | Ito et al. ................................ 165/42 |
| 5,894,737 | 4/1999 | Haeck ................................... 165/42 |

FOREIGN PATENT DOCUMENTS

| 0026615 | 2/1983 | Japan ................................. 165/43 |
| 62-50215 | 3/1987 | Japan . |
| 2-15508 | 1/1990 | Japan . |
| 2-5-25286 | 6/1993 | Japan . |
| 5-193342 | 8/1993 | Japan . |

*Primary Examiner*—John K. Ford
*Attorney, Agent, or Firm*—Harness, Dickey & Pierce, PLC

[57] ABSTRACT

An air conditioning apparatus for a vehicle includes a front air-conditioning unit for adjusting a temperature of air blown toward a front seat side in a passenger compartment, and a rear air-conditioning unit for adjusting a temperature of air blown toward a rear seat side in the passenger compartment. In the front air-conditioning unit, a ratio between an amount of air passing through a front heater core and an amount of air bypassing the front heater core is adjusted by an air mixing door, and the temperature of air blown toward the front seat side in the passenger compartment is adjusted by the rotation of the air mixing door. On the other hand, in the rear air-conditioning unit, a flow control valve for controlling a flow rate of hot water flowing into a rear heater core is provided, and the temperature of air blown toward the rear seat side in the passenger compartment is adjusted by the flow control valve. Thus, the air conditioning apparatus has a downsized rear air-conditioning unit while preventing air-conditioning capacity for the passenger compartment from being lowered.

9 Claims, 11 Drawing Sheets

AIR CONDITIONING APPARATUS FOR VEHICLE

CROSS-REFERENCE TO RELATED APPLICATION

This application is related to and claims priority from Japanese Patent Applications No. Hei. 9-204731 filed on Jul. 30, 1997, and No. Hei. 9-215041 filed on Aug. 8, 1997, the contents of which are hereby incorporated by reference.

BACKGROUND OF THE INVENTION

1. Field of the Invention

The present invention relates to an air conditioning apparatus for a vehicle, which has a front air-conditioning unit for controlling a temperature of air blown toward a front seat side in a passenger compartment, and a rear air-conditioning unit for controlling a temperature of air blown toward a rear seat side in the passenger compartment. The air conditioning apparatus is suitable for a one-box type recreational vehicle (RV).

2. Description of Related Art

In recent years, to improve air-conditioning feeling for a passenger compartment in a one-box type recreational vehicle, an air conditioning apparatus includes a front air-conditioning unit for controlling the temperature of air blown toward the front seat side (i.e., driver's seat and front-passenger's seat next to the driver's seat) in the passenger compartment, and a rear air-conditioning unit for controlling the temperature of air blown toward the rear seat side (i.e., the second seat, the third seat from the front seat) in the passenger compartment. Further, it is also required that the rear air-conditioning unit has cooling, heating and dehumidifying functions while finely continually controlling the temperature of air blown toward the passenger compartment from a low temperature to a high temperature, similarly to the front air-conditioning unit.

In the one-box type recreational vehicle, five doors are generally provided to increase a space of the passenger compartment, and a floor board of the passenger compartment is formed in flat from the front seat side to the rear seat side to improve comfortable performance of the passenger compartment. However, in the one-box type recreational vehicle, it is difficult to provide an arrangement space for accommodating the rear air-conditioning unit, while the floor board is formed in flat from the front seat side to the rear seat side.

Further, in the conventional rear air-conditioning unit, an evaporator and a heater core are disposed in an air conditioning case, and a ratio between an amount of air passing through the heater core and an amount of air bypassing the heater core is adjusted by an air mixing door to control the temperature of air blown toward the passenger compartment. However, because the air mixing door and a rotation space for rotating the air mixing door are necessary, the size of the rear air-conditioning apparatus is increased.

SUMMARY OF THE INVENTION

In view of the foregoing problems, it is a first object of the present invention to provide an air conditioning apparatus for a vehicle, which has a downsized rear air-conditioning unit while improving air-conditioning capacity for a passenger compartment of the vehicle.

It is a second object of the present invention to provide a rear air-conditioning unit for a rear seat side of a vehicle, in which a temperature of air blown toward a passenger compartment is adjusted by a flow control valve, and a temperature of air blown toward an upper portion at the rear seat side in the passenger compartment is made approximately equal to a temperature of air blown toward a lower portion at the rear seat side in the passenger compartment, during a rear bi-level mode.

It is a third object of the present invention to provide a rear air-conditioning unit for a rear seat side of a vehicle, in which a temperature of air blown toward a passenger compartment is adjusted by a flow control valve, and a temperature of air blown toward an upper portion at the rear seat side in the passenger compartment is made lower than a temperature of air blown toward a lower portion at the rear seat side in the passenger compartment, during a rear bi-level mode.

According to the present invention, in an air conditioning apparatus for a vehicle, a rear air-conditioning unit includes a rear cooling heat exchanger disposed approximately horizontally in a rear case, and a rear heating heat exchanger disposed at an upper side of the rear cooling heat exchanger approximately horizontally in the rear case. The rear case has a rear opening portion for blowing air toward a rear seat side in a passenger compartment of the vehicle, the rear opening portion is provided at an upper side of the rear heating heat exchanger, and a rear mode switching door slides and reciprocates approximately horizontally to open and close the rear opening portion. Thus, the cooling heat exchanger, the heating heat exchanger and the rear mode switching door can be disposed to have a thin structure in an up-down direction of the vehicle, a dimension of the rear air-conditioning unit in the up-down direction of the vehicle can be reduced. Accordingly, the rear air-conditioning unit can be disposed in a small space under a floor board in the passenger compartment. Further, the rear air-conditioning unit includes a flow control valve for adjusting a flow rate of hot water flowing into the rear heating heat exchanger. Therefore, in the rear air-conditioning unit, because an air mixing door is not necessary, an operation space of the air mixing door and a cool air/warm air mixing space are not necessary. Thus, the size of the rear air-conditioning unit is greatly reduced, a pressure-loss in an air passage of the rear air-conditioning unit is reduced, and an amount of air blown toward the passenger compartment can be increased. On the other hand, the air conditioning apparatus includes a front air-conditioning unit. In the front air-conditioning unit, a ratio between an amount of air passing through a front heating heat exchanger and an amount of air bypassing the front heating heat exchanger is adjusted by an air mixing door to adjust a temperature of air blown toward a front seat side in the passenger compartment. Thus, in the front air-conditioning unit, a temperature-response performance of the passenger compartment can be improved, and the temperature of air blown toward the front seat side in the passenger compartment can be rapidly changed according to a request of a passenger seated on a front seat in the passenger compartment. As a result, the air conditioning apparatus has a downsized rear air-conditioning unit while improving air-conditioning capacity for the passenger compartment of the vehicle.

Preferably, in the rear air-conditioning unit, the rear opening portion includes a rear face opening and a rear foot opening which are provided at an upper side of the rear heating heat exchanger to be adjacent in a front-rear direction of the vehicle. Therefore, the dimension of the rear air-conditioning unit in a width direction of the vehicle can be reduced. In the rear air-conditioning unit, refrigerant pipes of the rear cooling heat exchanger and hot water pipes of the rear heating heat exchanger are disposed within a dimension range of the rear cooling heat exchanger and the rear heating heat exchanger in the width direction of the vehicle. Further, the flow control valve is also disposed within the dimension range of the rear cooling heat exchanger and the rear heating heat exchanger. Thus, the dimension of the rear air-conditioning unit can be further reduced. As a result, the rear air-conditioning unit can be disposed within a small space in the width direction of the vehicle, such as a space at a rear side of a rear tire of the vehicle.

More preferably, the rear heating heat exchanger includes an inlet tank and an outlet tank which are disposed to form a predetermined distance therebetween, and a plurality of tubes which are disposed between the inlet tank and the outlet tank in parallel with each other, the rear heating heat exchanger is a one-way type in which hot water flows from the inlet tank toward the outlet tank through the tubes in one way, and the rear face opening and the rear foot opening are provided at a downstream air side of the rear heating heat exchanger to be adjacent to each other in a direction perpendicular to a longitudinal direction of the tubes of the rear heating heat exchanger. Therefore, air supplying to the rear face opening and air supplying to the rear foot opening respectively pass through the rear heating heat exchanger over all length of the tubes in the longitudinal direction of the tubes. Thus, the temperature of air blown from the rear face opening toward an upper portion at the rear seat side in the passenger compartment is approximately equal to the temperature of air blown from the rear foot opening toward a lower portion at the rear seat side in the passenger compartment.

Still more preferably, in the rear air-conditioning unit, the rear heating heat exchanger is disposed in the rear case to form a rear cool air passage through which air having passed through the rear cooling heat exchanger bypasses the rear heating heat exchanger, the rear cool air passage is provided at a side of the rear face opening, and a predetermined amount of air from the rear cool air passage is introduced into the rear face opening, during a rear bi-level mode where air is blown from both of the rear face opening and the rear foot opening. Therefore, the temperature of air blown from the rear face opening can be made lower than the temperature of air blown from the rear foot opening. Thus, a temperature difference of blown-air, for "cooling head portion and heating foot portion", can be obtained. Further, the rear air-conditioning unit includes an adjustment member for adjusting an opening degree of the rear cool air passage, and the adjustment member adjusts the opening degree of the rear cool air passage to adjust an amount of air flowing from the rear cool air passage into the rear face opening, during the rear bi-level mode. Thus, the temperature difference between air blown from the rear foot opening and air blown from the rear face opening can be adjusted.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention are described hereinafter with reference to the accompanying drawings.

A first preferred embodiment of the present invention will be now described with reference to FIGS. 1–12.

The first embodiment of the present invention is applied to an one-box type recreational vehicle (RV). The vehicle 10 shown in FIG. 1 has five doors, and a floor board 11 of a passenger compartment R (see FIG. 3) is formed in flat from a front seat side (i.e., a driver's seat side and a front passenger's seat side next to the driver's seat) to a rear seat side (e.g., a second seat side and a third seat side from the front seat) to improve comfortable performance of a passenger in the passenger compartment.

Figure 1:
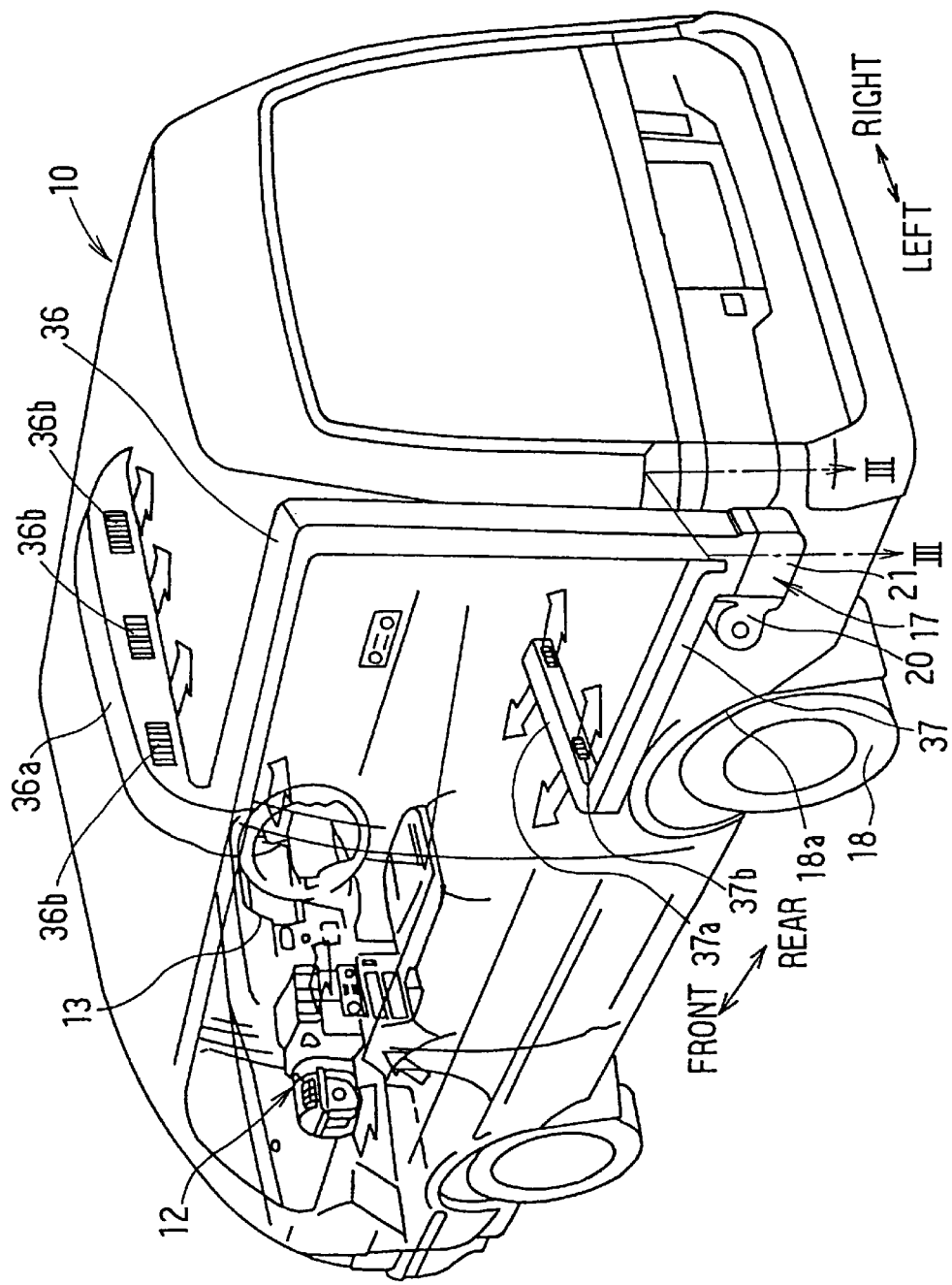
FIG. 1 is a schematic perspective view showing an entire structure of a vehicle according to a first preferred embodiment of the present invention.
Figure 2:
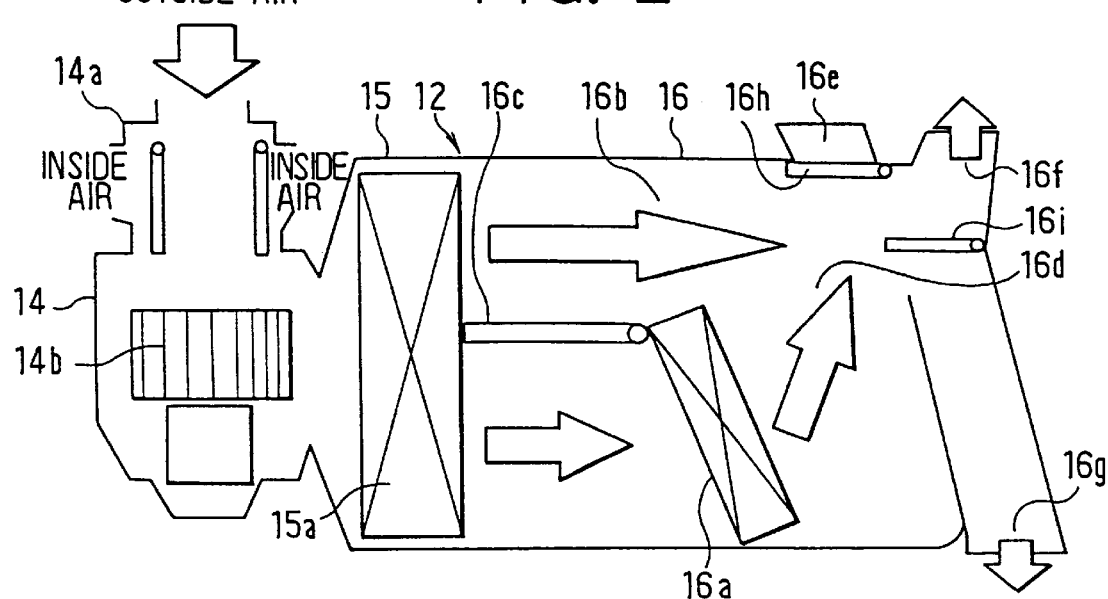
FIG. 2 is a schematic sectional view showing a front air-conditioning unit mounted on the vehicle in FIG. 1.

As shown in FIG. 1, a front air-conditioning unit 12 for adjusting a temperature of air blown toward the front seat side in the passenger compartment is disposed in an inside portion of an instrument panel 13. As shown in FIG. 2, the front air-conditioning unit 12 includes a blower unit 14, a cooling unit 15 and a heating unit 16. The blower unit 14 includes an inside/outside air switching box 14a for introducing therein inside air (i.e., air inside the passenger compartment) or outside air (i.e., air outside the passenger compartment) and a centrifugal fan 14b. The cooling unit 15 has an evaporator 15a of a refrigerant cycle, for cooling air passing therethrough. In the refrigerant cycle, refrigerant is compressed by a compressor to have a high temperature and a high pressure, and the high-temperature high-pressure gas refrigerant discharged from the compressor is condensed in a condenser. The condensed refrigerant from the condenser is separated into liquid refrigerant and gas refrigerant in a receiver. The liquid refrigerant from the receiver is press-reduced in a thermal expansion valve, and flows into the evaporator 15a. Refrigerant absorbs heat from air in the evaporator 15a to be evaporated, and the evaporated gas refrigerant is sucked into the compressor to be compressed again.

The compressor, the condenser and the receiver of the refrigerant cycle are disposed in an engine compartment of the vehicle, and the thermal expansion valve is disposed at a position proximate to the evaporator 15a. In the refrigerant cycle, an evaporator 25 of a rear air-conditioning unit 17 (described later) is disposed in parallel with the evaporator 15a of the front air-conditioning unit 12.

Next, the heater unit 16 of the front air-conditioning unit 12 will be described. The heater unit 16 is an air mixing type, and includes a heater core 16a which heat air passing therethrough using hot water (i.e., engine-cooling water) from an engine 30. In the heater unit 16, the heater core 16a is disposed to form a bypass passage 16b, and an air mixing door 16c is rotatably disposed at an upstream-air position of the heater core 16a. Therefore, by the rotation of the air mixing door 16c, a ratio between an amount of air passing through the heater core 16a and an amount of air passing through the bypass passage 16b can be adjusted to adjust a temperature of air blown toward the front seat side in the passenger compartment. In the heater unit 16, an air mixing chamber 16d for mixing warm air from the heater core 16a and cool air from the bypass passage 16b is provided at a downstream air side of the heater core 16a.

A defroster opening portion 16e, a face opening portion 16f and a foot opening portion 16g are respectively opened at a downstream end side of the heater unit 16, and the opening portions 16e–16g are opened and closed by two mode switching doors 16h, 16i. Air passing through the defroster opening portion 16e is blown toward an inner surface of a windshield of the vehicle from a defroster air outlet, air passing through the face opening portion 16f is blown toward the upper portion of a passenger seated on a front seat from a face air outlet, and air passing through the foot opening portion 16g is blown toward the foot portion of the passenger seated on the front seat from a foot air outlet.

Next, the rear air-conditioning unit 17 will be now described. The rear air-conditioning unit 17 is disposed at the rear seat side (e.g., the second or third seat side from the front seat) so that the temperature of air blown toward the rear seat side in the passenger compartment can be adjusted. In the first embodiment, as shown in FIG. 1, the rear air-conditioning unit 17 is disposed at a rear side of a rear tire housing 18a for accommodating a left-side rear tire 18.

Figure 3:
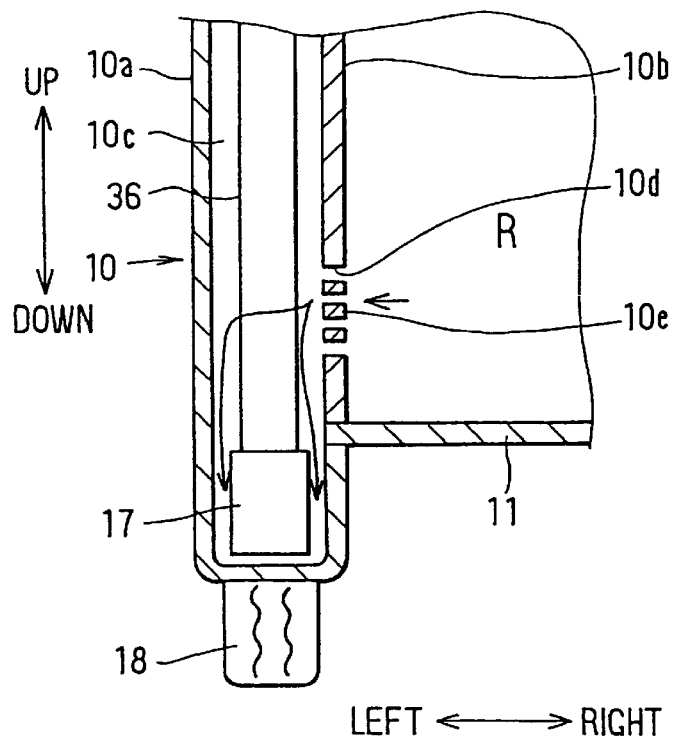
FIG. 3 is a cross-sectional view taken along line III—III in FIG. 1.

As shown in FIG. 3, the rear air-conditioning unit 17 is held in a side space 10c between an outer plate 10a and an inner plate 10b of the vehicle 10, at a position lower than the floor board 11 of the vehicle 10. Therefore, the outer plate 10a and the inner plate 10b extend downward from the floor board 11, and a holding portion for holding the rear air-conditioning unit 17 is provided at a position below the floor board 11 between the outer plate 10a and the inner plate 10b. A communication port 10d through which the side space 10c communicates with the passenger compartment R is provided in the inner plate 10b, and a reticulate plate 10e for preventing an alien substance such as paper from entering into the side space 10c is disposed in the communication port 10 d.

Figure 4:
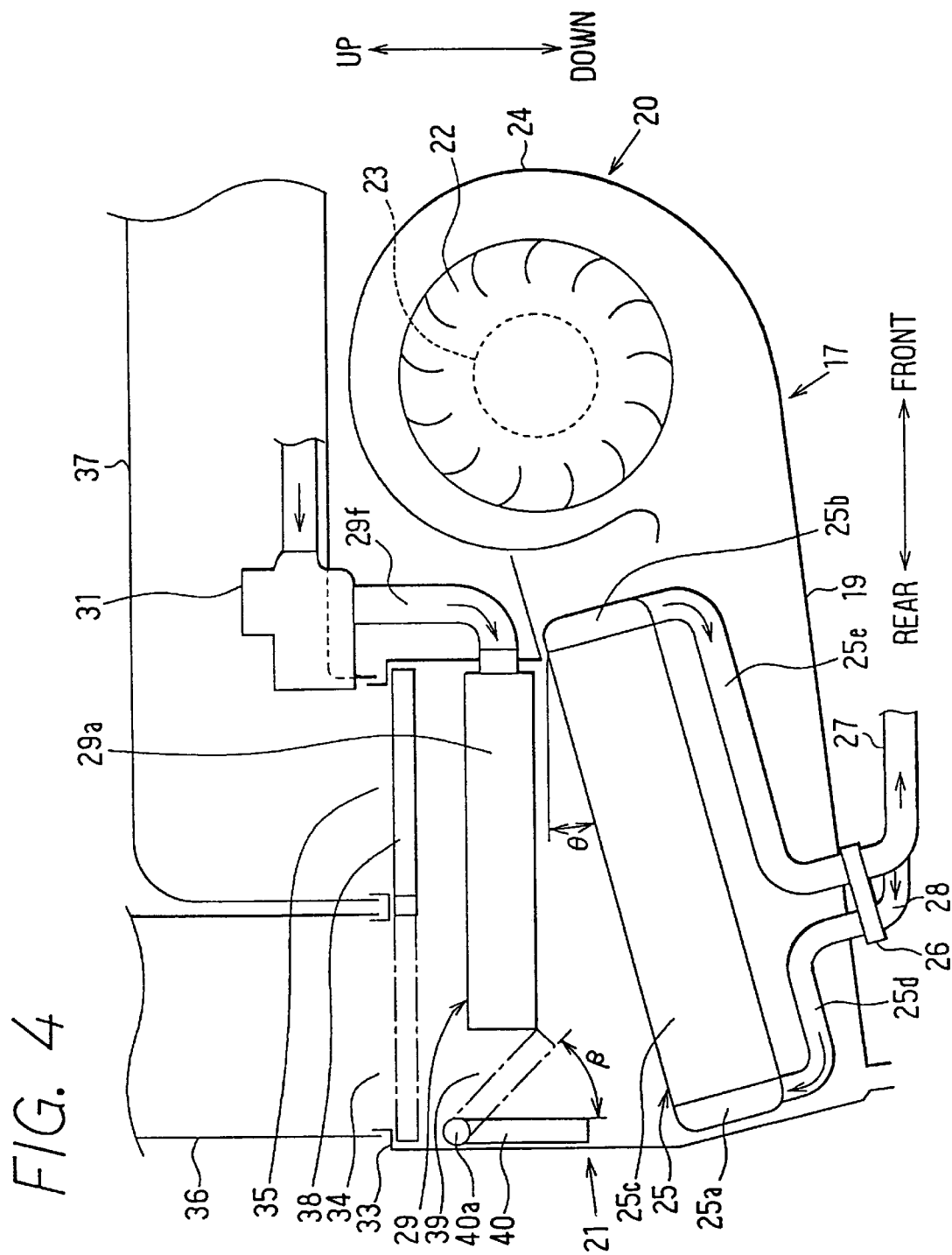
FIG. 4 is a schematic vertical-sectional view showing a rear air-conditioning unit mounted on the vehicle in FIG. 1.
Figure 5:
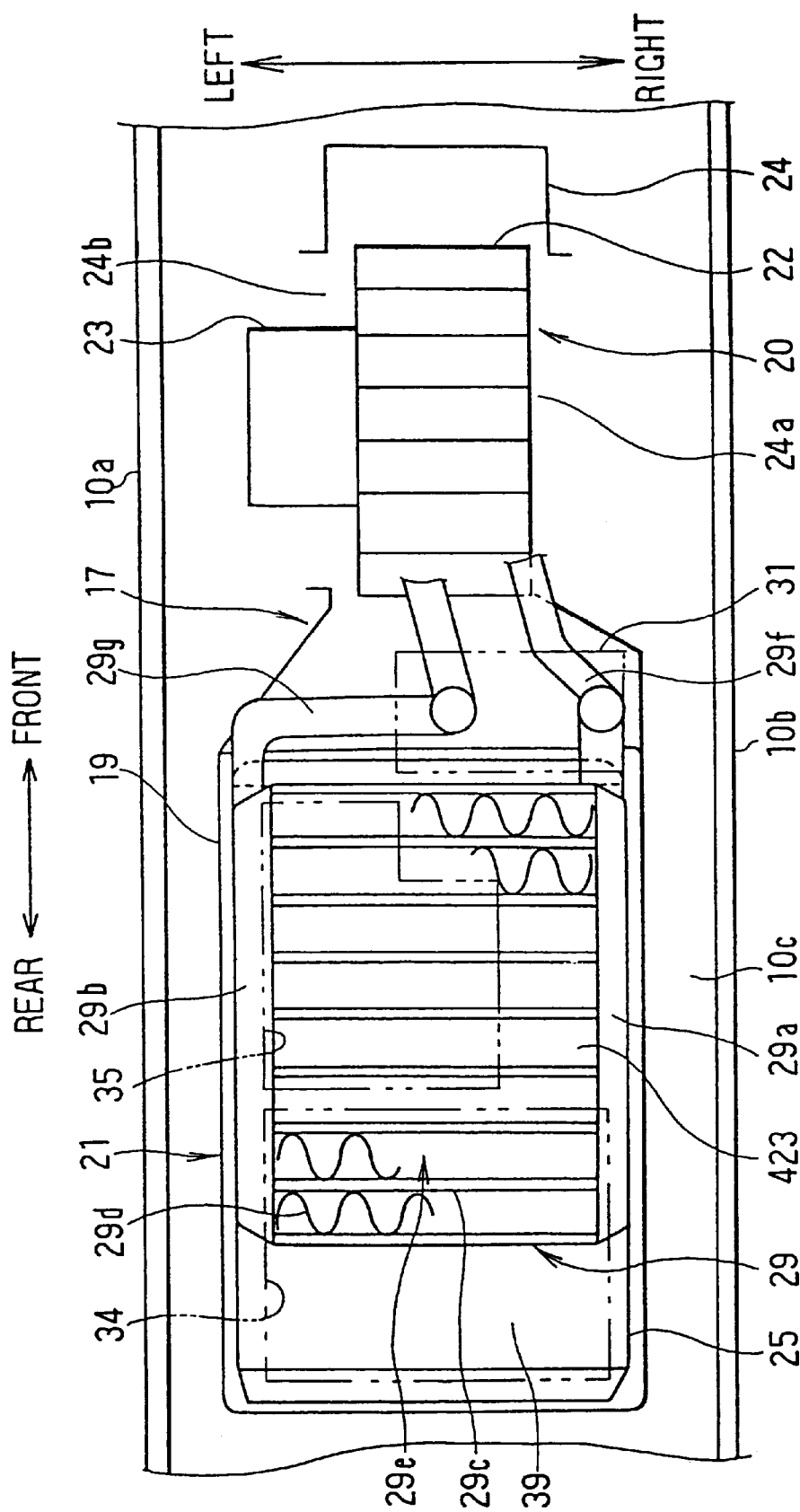
FIG. 5 is a schematic horizontal-sectional view showing the rear air-conditioning unit mounted on the vehicle in FIG. 1.

Here, the structure of the rear air-conditioning unit 17 will be now described in detail with reference to FIGS. 1, 4 and 5. FIG. 4 is a vertical sectional view of the rear air-conditioning unit 17, and FIG. 5 is a horizontal sectional view of the rear air-conditioning unit 17. The rear air-conditioning unit 17 includes a rear air-conditioning case 19 made of resin such as polypropylene. The rear air-conditioning case 19 is composed of a plurality of division cases which are integrally connected by fastening means. The rear air-conditioning unit 17 includes a blower unit 20 and a heat-exchanging unit 21 in which a cooler portion and a heater portion are integrated. In the first embodiment, as shown in FIGS. 1 and 5, the blower unit 20 is disposed at a front side, and the heat exchanging unit 21 is disposed at a rear side of the blower unit 20 in a front-rear direction of the vehicle.

The blower unit 20 includes a centrifugal fan (e.g., sirocco fan) 22, a motor 23 for driving the fan 22, and a scroll casing 24 for accommodating the centrifugal fan 22. The centrifugal fan 22 sucks air from two air suction ports 24a, 24b formed at two sides in an axial direction of the centrifugal fan 22. The motor 23 is held in a peripheral portion of the air suction port 24b through a stay (not shown). The blower unit 20 of the rear air-conditioning unit 17 sucks only inside air within the passenger compartment R through the side space 10c and the communication port 10d, and does not suck outside air (i.e., air outside the passenger compartment). By the rotation of the centrifugal fan 22, inside air introduced into the side space 10c is sucked into the scroll casing 24 from the air suction ports 24a, 24b, and is blown toward the heat-exchanging unit 21.

The heat-exchanging unit 21 of the rear air-conditioning unit 17 is disposed in the rear air-conditioning case 19 at a downstream air side of the blower unit 20. The heat-exchanging unit 21 includes an evaporator 25 branched from the refrigerant cycle of the front air-conditioning unit 12. The evaporator 25 is disposed approximately horizontally in the rear air-conditioning case 19 at a lower side of the vehicle, as shown in FIG. 4. The evaporator 25 is formed approximately in a rectangular, and is thin in an up-down direction of the vehicle. In the first embodiment, to readily discharge condensed water generated in the evaporator 25, the evaporator 25 is slightly inclined from a horizontal direction by an angle θ (e.g., approximately 18°). That is, a downstream air end of the evaporator 25 is inclined toward a low side of the vehicle. Therefore, condensed water condensed in the evaporator 25 is collected at an inclined lower end of the evaporator 25 along air flow, and can be readily discharged from the inclined lower end to the outside of the rear air-conditioning case 19.

The evaporator 25 includes a pair of tanks 25a, 25b disposed to have a predetermined distance therebetween, and a heat-exchanging portion 25c. The heat-exchanging portion 25c of the evaporator 25 has a plurality of flat tubes disposed between the tanks 25a, 25b in parallel with each other, and a plurality of corrugated fins each of which is connected adjacent flat tubes. A refrigerant inlet pipe 25d and a refrigerant outlet pipe 25e are respectively connected to the tanks 25a, 25b. To reduce a dimension of the evaporator in a width direction (i.e., right-left direction) of the vehicle, the refrigerant inlet pipe 25d and the refrigerant outlet pipe 25e are respectively connected to lower side surfaces (bottoms) of the tanks 25a, 25b, and extend toward lower sides of the tanks 25a, 25b. Top ends of the refrigerant inlet pipe 25d and the refrigerant outlet pipe 25e penetrate through a bottom of the rear air-conditioning case 19, and are connected to a thermal expansion valve 26 at the outside of the rear air-conditioning case 19. The thermal expansion valve 26 is a box type, and has therein a temperature sensor for detecting a temperature of refrigerant at an outlet of the evaporator 25. The thermal expansion valve 26 adjusts a flow rate of refrigerant flowing into the refrigerant inlet pipe 25d, so that a super-heating degree of refrigerant, at the outlet of the evaporator 25, can be maintained at a set value.

A low-pressure refrigerant pipe 27 and a high-pressure refrigerant pipe 28 connected to the thermal expansion valve 26 extend toward a front side of the vehicle through the side space 10c, and protrude into the engine compartment. In the engine compartment, the low-pressure refrigerant pipe 27 is connected to a suction port of the compressor of the refrigerant cycle, and the high-pressure refrigerant pipe 28 is connected to a liquid refrigerant pipe of the receiver of the refrigerant cycle.

Figure 6:
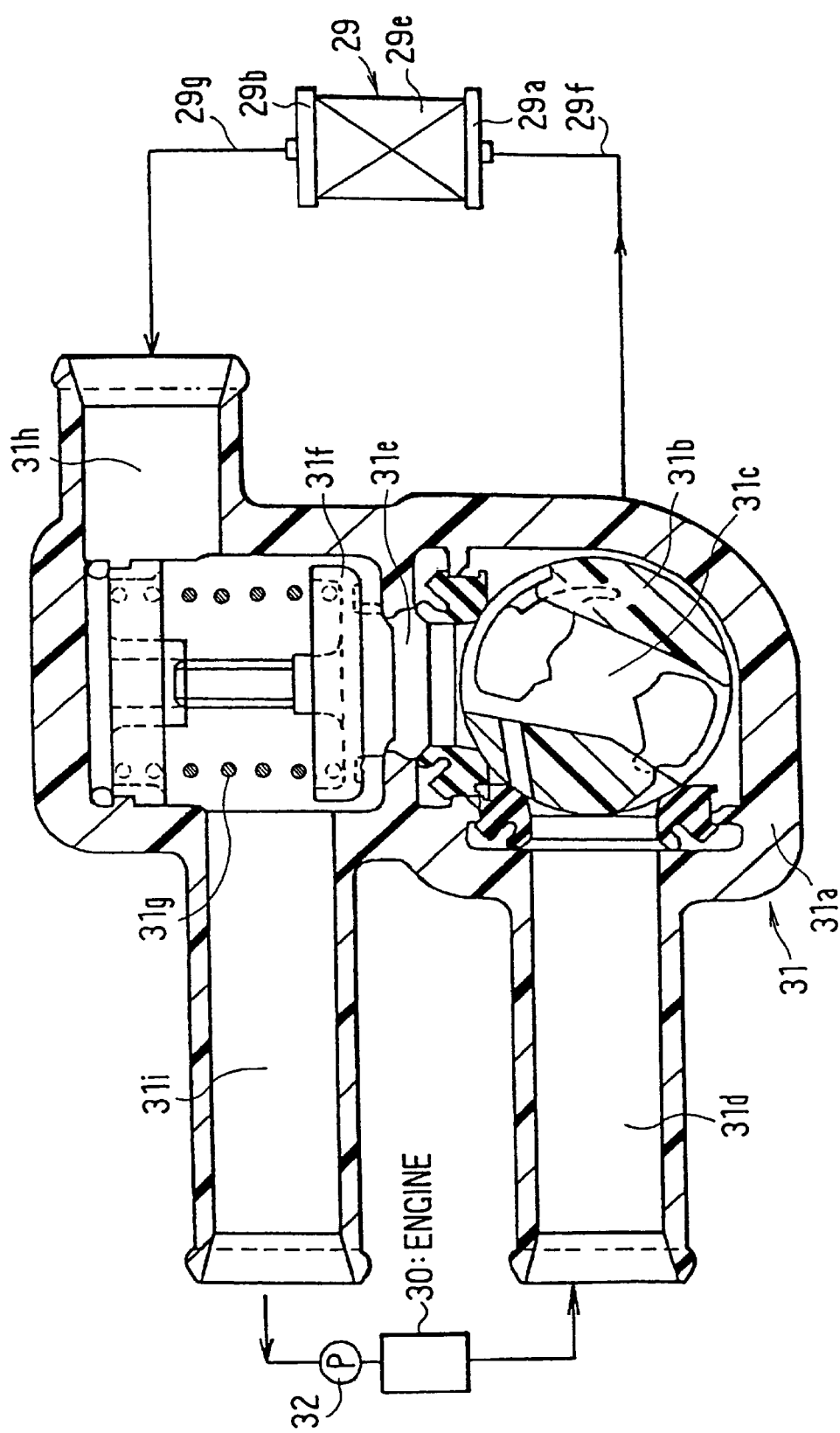
FIG. 6 is a view showing a hot water circuit of a heater core of the rear air-conditioning unit according to the first embodiment.

In the heat exchanging unit 21 of the rear air-conditioning unit 17, a heater core (heating heat exchanger) 29 is disposed horizontally at an upper side of the evaporator 25. As shown in FIG. 6, the heater core 29 heats air passing therethrough using hot water from the engine 30 of the vehicle 10. As shown in FIG. 5, the heater core 29 includes an inlet tank 29a and an outlet tank 29b disposed to form a predetermined distance therebetween, and a heat-exchanging portion 29e. The heat-exchanging portion 29e of the heater core 29 has a plurality of flat tubes 29c disposed in parallel with each other, and a plurality of corrugated fins 29d each of which is disposed between adjacent flat tubes 29c.

In the heater core 29, hot water from the inlet tank 29a flows in one way toward the outlet tank 29b through the flat tubes 29c. A hot water inlet pipe 29f through which hot water flows into the heater core 29 is connected to the inlet tank 29a, and hot water outlet pipe 29g for discharging hot water is connected to the outlet tank 29b. The hot water inlet pipe 29f and the hot water outlet pipe 29g extend toward the vehicle front side through the side space 10c, protrude into the engine compartment, and are respectively connected to the engine 30 of the vehicle 10. To reduce a dimension of the heater core 29 in the width direction (i.e., right-left direction) of the vehicle 10, the inlet tank 29a and the outlet tank 29b are disposed approximately in parallel with the front-rear direction of the vehicle, and the hot water inlet pipe 29f and the hot water outlet pipe 29g are respectively connected to longitudinal ends of the inlet tank 29a and outlet tank 29b. That is, in a width dimension range of the heater core 29 in the width direction of the vehicle 10, the hot water inlet pipe 29f and the hot water outlet pipe 29g are respectively connected to the inlet tank 29a and the outlet tank 29b.

A flow control valve 31 for adjusting an amount of hot water flowing into the heater core 29 is disposed in the hot water inlet pipe 29f and the hot water outlet pipe 29g. The flow control valve 31 adjusts the amount of hot water flowing into the heater core 29 to control heating-air capacity of the heater core 29. To reduce the dimension of the heat-exchanging unit 21 in the width direction of the vehicle, the flow control valve 31 is also disposed within the width dimension range of the heater core 29 at a vehicle front side of the rear air-conditioning case 19.

As shown in FIG. 6, hot water from the engine 30 of the vehicle 10 is supplied to the heater core 29 through the flow control valve 31 by a water pump 32. The flow control valve 31 includes a case 31a made of resin, and a cylindrical valve body (i.e., rotor) 31b rotatably held in the case 31a. A control passage 31c for controlling a flow rate of hot water is formed in the valve body 31b. The control passage 31c is throttled in two steps at a hot water inlet side and a hot water outlet side thereof. Each throttle amount at the hot water inlet side and the hot water outlet side of the control passage 31c is adjusted by the rotation amount of the valve body 31b to control the flow rate of hot water. A first hot water inlet 31d for introducing hot water from the engine 30 is formed in the case 31a, and hot water introduced from the hot water inlet 31d is supplied to the heater core 29 from an hot water outlet (not shown) through the control passage 31c.

Further, a bypass passage 31e is formed within the case 31a, and hot water from an intermediate position between two step throttles of the control passage 31c of the valve body 31b flows through the bypass passage 31e to bypass the heater core 29. A pressure-response valve (i.e., bypass valve) 31f is disposed in the bypass passage 31e. The pressure-response valve 31f increase an opening area (i.e., opening degree) of the bypass passage 31e according to a pressure increase of hot water supplied from the engine 30. A spring force of a coil spring 31g is applied to the pressure-response valve 31f in a direction to close the pressure-response valve 31f. A second hot water inlet 31h through which hot water having passed through the heater core 29 is introduced into the flow control valve 31 is formed in the case 31a. Hot water having passed through the heater core 29 and hot water flowing through the bypass passage 31e are joined at a downstream air side of the pressure-response valve 31f, and the joined hot water returns to the engine 30 from a hot water outlet 31i formed in the case 31a.

In the flow control valve 31 shown in FIG. 6, each throttle amount of the two-step throttles of the control passage 31c is adjusted by the rotation amount of the valve body 31b to adjust the flow rate of hot water flowing into the heater core 29, and the pressure-response valve 31 suppresses the variation in flow rate of hot water supplying to the heater core 29 due to variation in an engine rotational speed. Therefore, variation in the temperature of air blown from the heater core 29 can be suppressed, and the temperature of air blown from the rear air-conditioning unit 17 can be accurately controlled.

As shown in FIGS. 4 and 5, on an upper portion 33 of the heater core 29 in the rear air-conditioning case 19, there are formed a face opening portion 34 for blowing air toward the head portion of a passenger seated the rear seat in the passenger compartment, and a foot opening portion 35 for blowing air toward the foot portion of the passenger seated on the rear seat in the passenger compartment. The face opening portion 34 and the foot opening portion 35 are provided at an upper side (a downstream air side) of the heater core 29 to be opposite to the heater core 29. As shown in FIG. 5, the face opening portion 34 and the foot opening portion 35 are provided adjacently in a direction vertical to a longitudinal direction of the flat tubes 29c, that is, in the front-rear direction of the vehicle. Thus, the face opening portion 34 and the foot opening portion 35 can be provided within the dimension range of the evaporator 25 and the heater core 29 in the width direction of the vehicle.

On end of a face duct 36 is connected to the face opening portion 34, and the other end of the face duct 36 extends upward to a ceiling portion of the side space 10c, as shown in FIG. 3. A ceiling duct 36a extending in the width direction of the vehicle is formed in the ceiling portion as shown in FIG. 1, and a plurality of face air outlets 36b for blowing air toward the head portion of the passenger seated on the rear seat in the passenger compartment are formed in the ceiling duct 36a.

Further, one end of a foot duct 37 is connected to the foot opening portion 35, and the foot duct 37 is disposed under the floor board 11 without protruding from an upper surface of the floor board 11. A duct portion 37a extending in the width direction of the vehicle 10 is formed at the other end of the foot duct 37, and only the duct portion 37a is disposed at an upper side of the floor board 11. In the duct portion 37a, a plurality of foot air outlets 37b for blowing air toward the foot portion of the passenger seated on the rear seat in the passenger compartment are formed. Through the foot air outlets 37b, air can be blown toward front and rear two sides of the vehicle 10.

Because the face opening portion 34 and the foot opening portion 35 are provided to be adjacent in the front-rear direction of the vehicle, one end sides of the face duct 36 and the foot duct 37 are disposed to be adjacent in the front-rear direction of the vehicle. As a result, the dimension of the rear air-conditioning unit 17 in the width direction of the vehicle can be reduced.

A mode switching door 38 for opening and closing the face opening portion 34 and the foot opening portion 35 is disposed at an upstream air side (lower side) of the face and foot opening portions 34, 35. The mode switching door 38 is a plate-like slide door which reciprocates along opening surfaces of the face opening portion 34 and the foot opening 35 to open and close the opening portions 34, 35. The mode switching door 38 slides between the solid line position and the chain line position in FIG. 4 along the opening surfaces of the opening portion 34, 35 through a link mechanism. Because the mode switching door 38 reciprocates along the horizontal direction, a moving space of the mode switching door 38 in the up-down direction of the vehicle is not necessary; and therefore, the dimension of the rear air-conditioning case 19 in the up-down direction of the vehicle can be reduced.

In the rear air-conditioning case 19, a cool air bypass passage 39 through which cool air having passed through the evaporator 25 bypasses the heater core 25 is formed at a side of the heater core 29 to be proximate to the face opening portion 34, as shown in FIG. 4. Therefore, approximate all of air from the cool air bypass passage 39 flows into the face opening portion 34. A cool air bypass door 40 for opening and closing the cool air bypass passage 39 is provided in the rear air-conditioning case 19 at a position proximate to the cool air bypass passage 39. The cool air bypass door 40 is a plate-like door rotating around a rotary shaft 40a between the solid line position and the chain line position in FIG. 4. As shown in FIG. 4, the cool air bypass door 40 can be rotated in a rotation angle range β to adjust an opening degree of the cool air bypass passage 39.

Here, the operations of the front air-conditioning unit 12 and the rear air-conditioning unit 17 will be now described. First, the operation of the front air-conditioning unit 12 is described. As shown in FIG. 2, inside air or outside air is introduced from the inside/outside air switching box 14a of the blower unit, and is blown toward the cooling unit 15 by the fan 14b. Air blown by the blower unit 14 is cooled in the evaporator 15a of the cooling unit 15 to be cool air, and the cool air is heated in the heater core 16a of the heater unit 16 to be warm air by using hot water from the engine 30 of the vehicle. The air mixing door 16c is rotated at a predetermined position so that a ratio between an amount of warm air passing through the heater core 16a and an amount of cool air passing through the bypass passage 16b can be adjusted to control a temperature of air blown toward the front seat side in the passenger compartment. Warm air passing through the heater core 16a and cool air passing through the bypass passage 16b are mixed in the air mixing chamber 16d so that air blown toward the passenger compartment has a predetermined temperature. The defroster opening portion 16e, the face opening portion 16f and the foot opening portion 16g are opened and closed by the mode switching doors 16h, 16i, and air from the air mixing chamber 16d can be blown toward the passenger compartment through a defroster air outlet, a face air outlet or a foot air outlet opened by the mode switching doors 16h, 16i.

Next, the operation of the rear air-conditioning unit 17 will be now described. As shown in FIGS. 4 and 5, inside air within the side space 10c is sucked into the scroll casing 24 from the suction ports 24a, 24b by the operation of the fan 22, and is blown toward the heat-exchanging unit 21 placed at the rear side of the scroll casing 24. In the heat-exchanging unit 21, air firstly passes through the evaporator 25 to be cool air, and is heated while passing through the heater core 29. The flow rate of hot water flowing through the heater core 29 is continually adjusted by the flow control valve 31 to adjust the temperature of air blown toward the passenger compartment.

Figure 7:
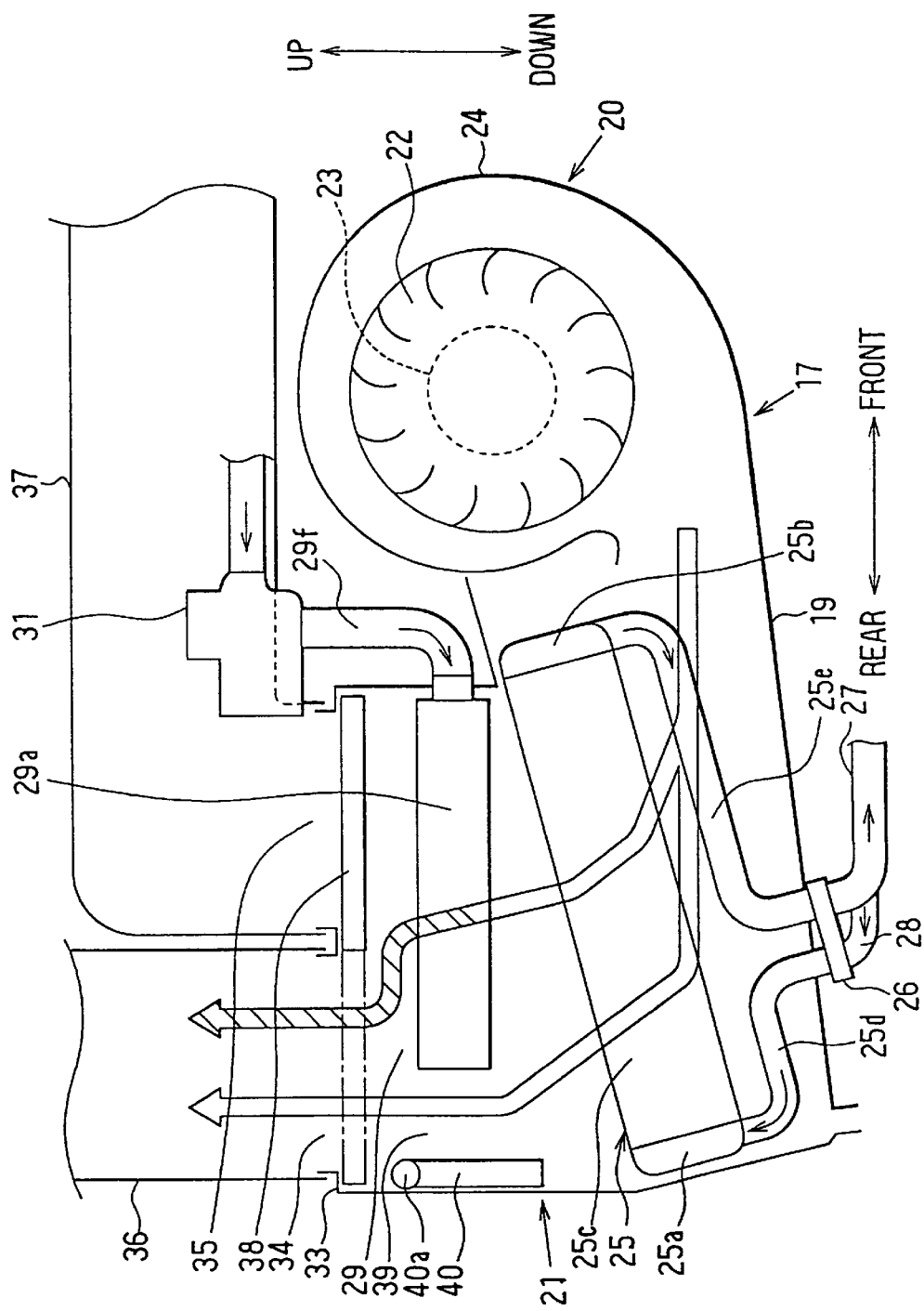
FIG. 7 is a schematic vertical-sectional view showing the rear air-conditioning unit during a rear face mode according to the first embodiment.

The face opening portion 34 and the foot opening portion 35 are opened and closed by the reciprocate sliding-movement of the mode switching door 38. When the mode switching door 38 opens the face opening portion 34 and closes the foot opening portion 35, a rear face mode is set in the rear air-conditioning unit as shown in FIG. 7. In the rear face mode, air is only blown from the face air outlets 36b through the face opening portion 34 and the face duct 36. During the rear face mode, the cool air bypass passage 39 is opened by the cool air bypass door 40 to reduce air-flow resistance (pressure loss). Therefore, when the maximum cooling mode is set during the rear face mode, an amount of cool air blown toward the passenger compartment can be increased, and cooling capacity for the passenger compartment can be improved.

Figure 8:
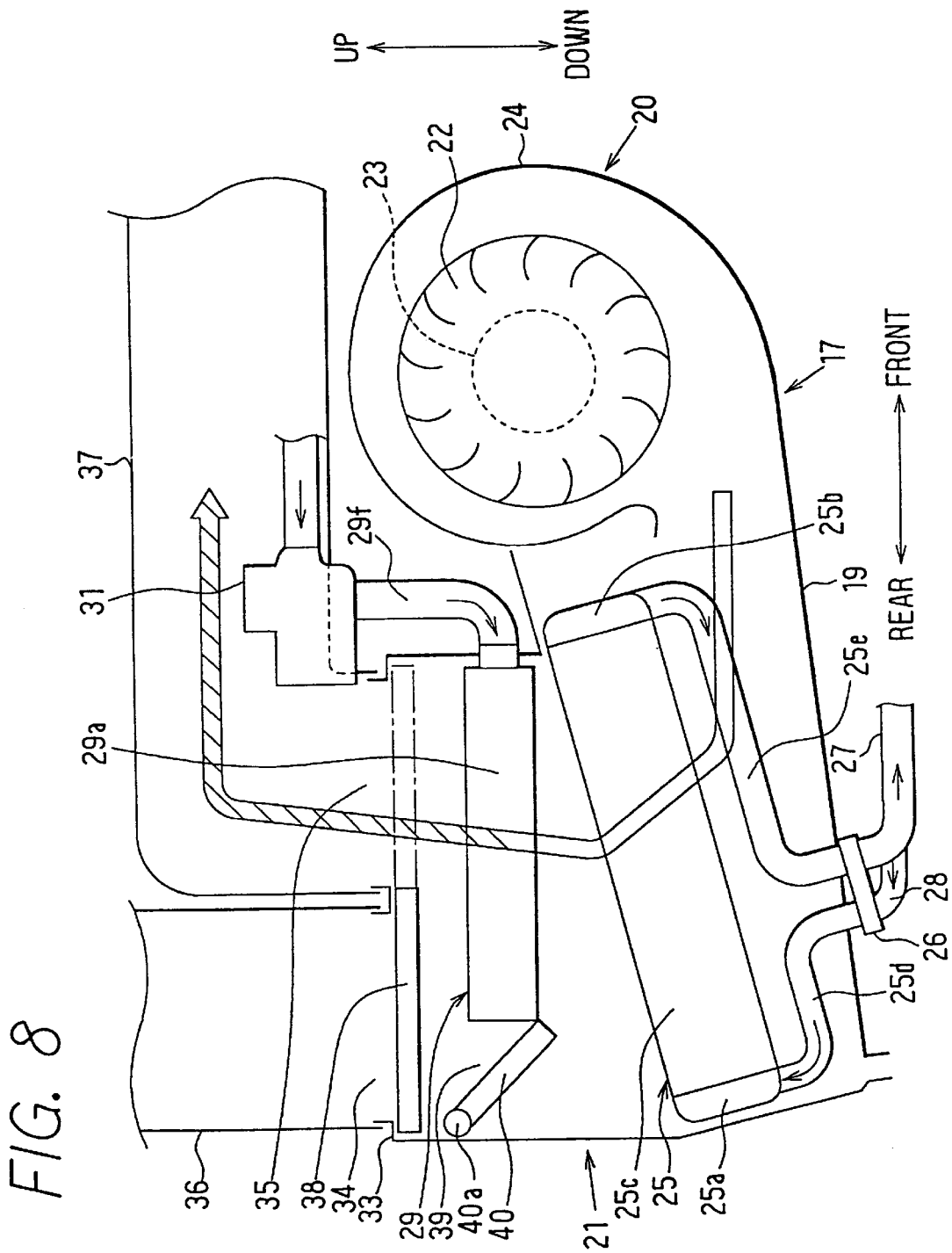
FIG. 8 is a schematic vertical-sectional view showing the rear air-conditioning unit during a rear foot mode according to the first embodiment.

When the mode switching door 38 opens the foot opening portion 35 and closes the face opening portion 34, a rear foot mode is set as shown in FIG. 8. During the rear foot mode, the cool air bypass door 40 closes the cool air bypass passage 39, and conditioned air is only blown from the foot air outlets 37b through the foot opening portion 36 and the foot duct 37.

Figure 9:
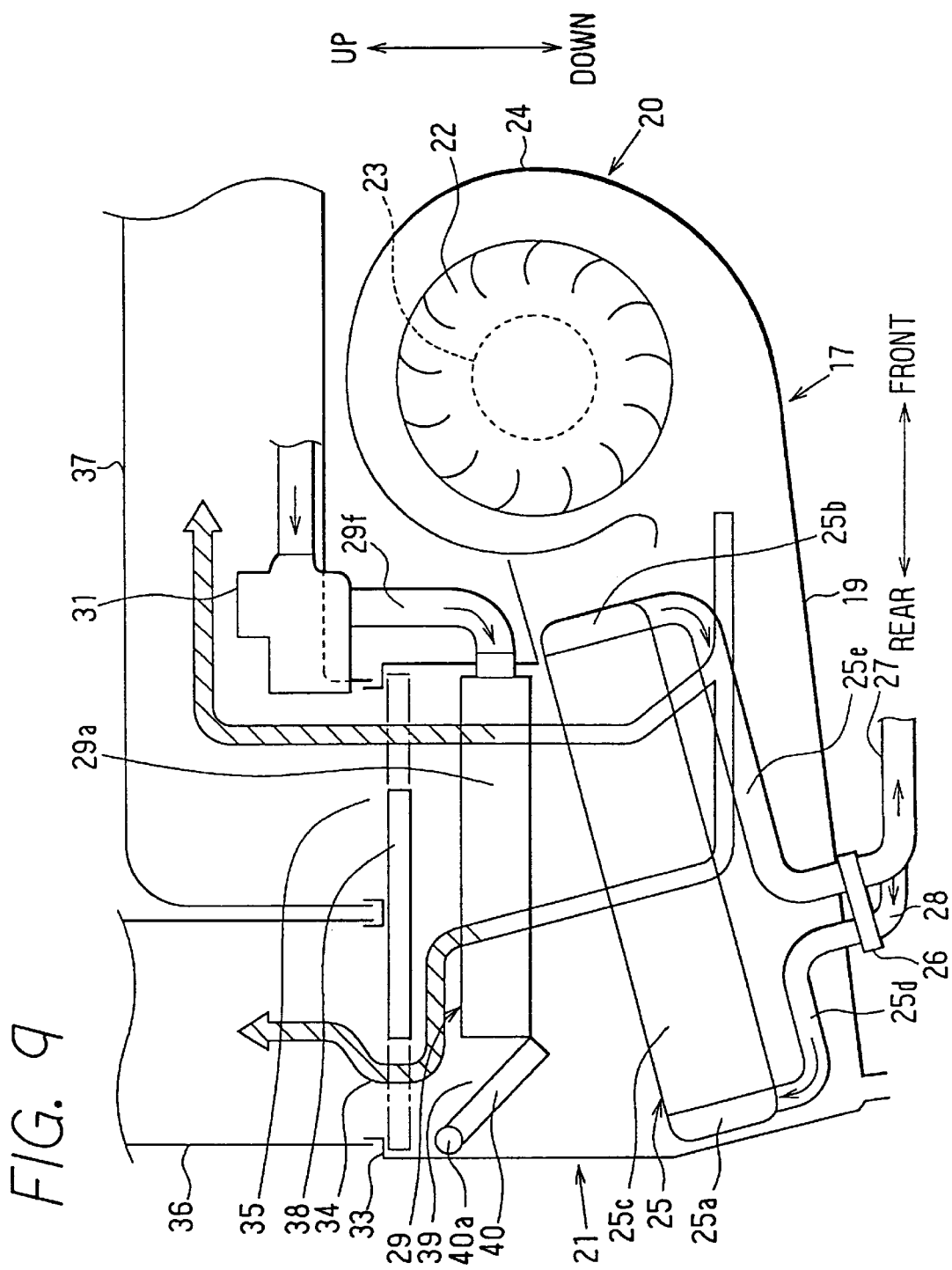
FIG. 9 is a schematic vertical-sectional view showing the rear air-conditioning unit during a rear bi-level mode according to the first embodiment.

When the mode switching door 38 is operated at an intermediate position so that both the face opening portion 34 and the foot opening portion 35 are opened, a rear bi-level mode is set as shown in FIG. 9. During the rear bi-level mode, conditioned air is simultaneously blown from the face and foot air outlets 36b, 37b through the face and foot opening portions 34, 35 and the face and foot ducts 36, 37, respectively.

During the rear bi-level mode, when the cool air bypass door 40 closes the cool air bypass passage 39 as shown in FIG. 9, the temperature of air blown from the face air outlets 36b is approximately equal to the temperature of air blown from the foot air outlets 37b.

According to the first embodiment of the present invention, in the rear air conditioning unit 17, the heater core 29 is one-way type in which hot water flows from the inlet tank 29a toward the outlet tank 29b through the flat tubes 29c in one way, and the face opening portion 34 and the foot opening portion 35 are provided at a downstream air side of the heat core 29 to be adjacent to each other in a direction perpendicular to the longitudinal direction of the flat tubes 29c of the heater core 29. Therefore, in the rear air-conditioning unit 17, air supplying to the face opening portion 34 and air supplying to the foot opening portion respectively pass through the heater core 29 over all length of the flat tubes 29c in the longitudinal direction of the flat tubes 29c. Thus, the temperature of air blown from the face opening portion 34 toward an upper portion at the rear seat side in the passenger compartment can be made approximately equal to the temperature of air blown from the foot opening portion 35 toward a lower portion at the rear seat side in the passenger compartment.

Next, control processes of the rear air-conditioning unit 17 will be now described with reference to FIGS. 10–12.

Figure 10:
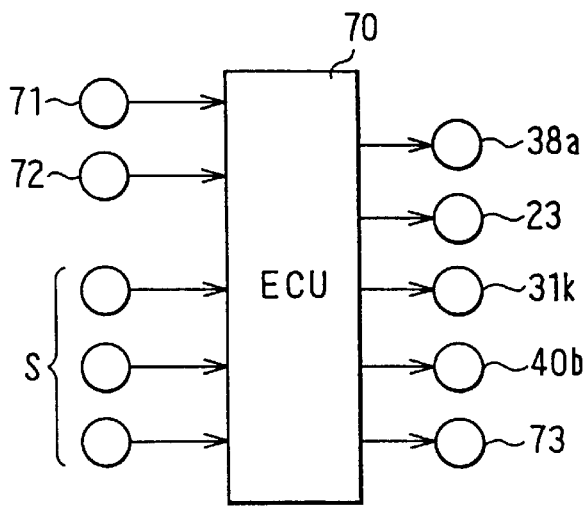
FIG. 10 is a block diagram showing an electrical control of an electrical control unit (ECU) according to the first embodiment.

On a rear air-conditioning control panel provided at a side portion of the rear seat of the vehicle 10, a rear air-conditioning switch 71 and a temperature setting switch 72 shown in FIG. 10 are provided. The rear air-conditioning switch 71 switches the rear air-conditioning unit 17 to be turned on or off, and the temperature setting switch 72 sets a temperature in the passenger compartment. Further, sensors S such as a sunlight sensor for detecting an amount of sunlight entering the passenger compartment, an inside air temperature sensor for detecting the temperature of inside air (i.e., air inside the passenger compartment), an outside air temperature sensor for detecting the temperature of outside air (i.e., air outside the vehicle), and a water temperature sensor for detecting the temperature of hot water flowing from the engine 30 are provided at predetermined positions of the vehicle 10, respectively.

As shown in FIG. 10, signals from the rear air-conditioning switch 71, the temperature setting switch 72 and the sensors S are input to an electrical control unit (hereinafter referred to as "ECU") 70. According to the input signals, the ECU 70 electrically controls a servomotor 38a for driving the mode switching door 38, the motor 23 for driving the centrifugal fan 22, a motor 31k for driving the flow control valve 31, a servomotor 40b for driving the rotary shaft 40a of the cool air bypass door 40, and the like. The ECU 70 can also control the front air-conditioning unit 12. However, in the first embodiment, only the control of the rear air-conditioning unit 17 is described.

Figure 11:
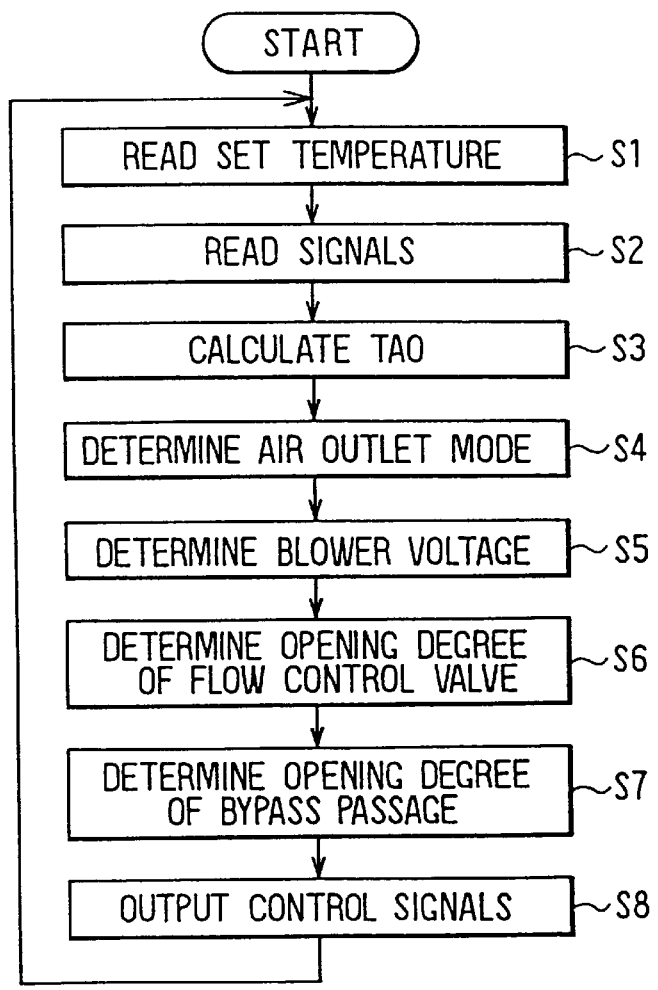
FIG. 11 is a flow chart showing control processes of the ECU according to the first embodiment.

When the rear air-conditioning switch 71 is turned on when the refrigerant cycle is operated, the control program shown in FIG. 11 starts. As shown in FIG. 11, at step S1, a set temperature set by the temperature setting switch 72 is read. Next, various signals from the sensors S are read at step S2. At step S3, a target temperature (TAO) of air blown toward the rear seat side in the passenger compartment is calculated based on the input signals. Next, an air outlet mode is determined based on the calculated TAO at step S4, a blower voltage applied to the blower motor 23 is determined at step S5, an opening degree of the flow control valve 31 is determined at step S6, and an opening degree of the cool air bypass passage 39 due to the cool air bypass door 40 is determined at step S7.

Next, at step S8, control signals are output to the servomotor 38a of the mode switching door 38, the motor 23 for driving the centrifugal fan 22, the motor 31k of the flow control valve 31, and the servomotor 40b of the rotary shaft 40a of the cool air bypass door 40, based on the determinations at steps S4–S7. In the first embodiment, at step S7 in FIG. 11, a subroutine shown in FIG. 12 is called, and the rotation position of the cool air bypass door 40 is determined. That is, as shown in FIG. 12, at step S41, it is determined whether or not the rear air outlet mode is the bi-level mode. When the bi-level mode is determined at step S41, the mode switching door 38 opens both the face opening portion 34 and the foot opening portion 35, and the cool air bypass door 40 fully closes the cool air bypass passage 39. That is, as shown in FIG. 9, because the cool air bypass door 40 fully closes the cool air bypass passage 39, the temperature of air blown toward the head portion of a passenger seated on the rear seat in the passenger compartment is approximately equal to the temperature of air blown toward the foot portion of the passenger in the passenger compartment, during the bi-level mode. As a result, as shown in FIG. 9, all air blown by the blower unit 20 is heated in the heater core 29 after passing through the evaporator 25. Warm air having passed through the heater core 29 passes through the face opening portion 34, and is blown toward the head portion of the passenger seated on the rear seat in the passenger compartment from the face air outlets 36b of the face duct 36. Simultaneously, warm air having passed through the heater core 29 passes through the foot opening portion 35, and is blown toward the foot portion of the passenger seated on the rear seat in the passenger compartment from the foot air outlets 37b through the foot duct 37. In the first embodiment, because the rear air-conditioning case 17 is disposed to be separated from the air outlets 36b, 37b, the face duct 36 and the foot duct 37 are made long. Therefore, air from the both opening portions 34, 35 are respectively sufficiently mixed while respectively passing through the face duct 36 and the foot duct 37. Thus, air blown from each of the face air outlets 36b and the foot air outlets 37b has uniform temperature distribution to prevent temperature unevenness of blown-air.

On the other hand, when the bi-level mode is not determined at step S41, it is determined whether or not the rear air outlet mode is the face mode at step S45. When the rear face mode is determined at step S45, the mode switching door 38 fully opens the face opening portion 34 and fully closes the foot opening portion 35, and the cool air bypass door 40 fully opens the cool air bypass passage 39 as shown in FIG. 7. Here, the rotation angle of the cool air bypass door 40 is 46°, for example. When the face mode is not determined at step S45 in FIG. 12, the mode switching door 38 fully closes the face opening portion 34 and fully opens the foot opening portion 35, and the cool air bypass door 40 fully closes the cool air bypass passage 39, as shown in FIG. 8.

A second preferred embodiment of the present invention will be now described with reference to FIGS. 13 and 14.

Figure 12:
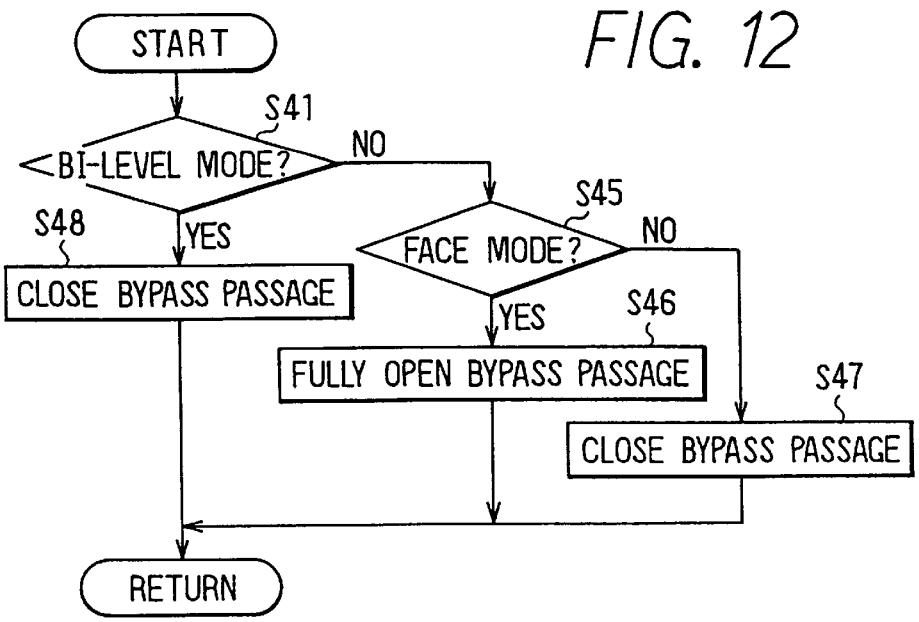
FIG. 12 is a flow chart showing control processes at step S7 in FIG. 11.

In the above-described first embodiment, at step S7 in FIG. 11, a subroutine shown in FIG. 12 is called. In the second embodiment, a subroutine shown in FIG. 13 is called at step S7 in FIG. 11. In the second embodiment, the other portions of the rear air-conditioning unit 17 are similar to those in the first embodiment, and the explanation thereof is omitted. In the second embodiment, when the bi-level mode is set at step S4 in FIG. 11 and the bi-level mode is determined at step S41 in FIG. 13, it is determined whether or not a sunlight amount Q detected by the sunlight sensor is larger than a predetermined amount $Q_0$. When the sunlight amount Q is larger than the predetermined amount $Q_0$, the cool air bypass door 40 is rotated by a rotation angle α so that the cool air bypass passage 39 is opened with a large opening degree which is smaller than the fully opening degree, at step S43. For example, in this case, the rotation angle α of the cool air bypass door 40 is set at 28°.

Figure 13:
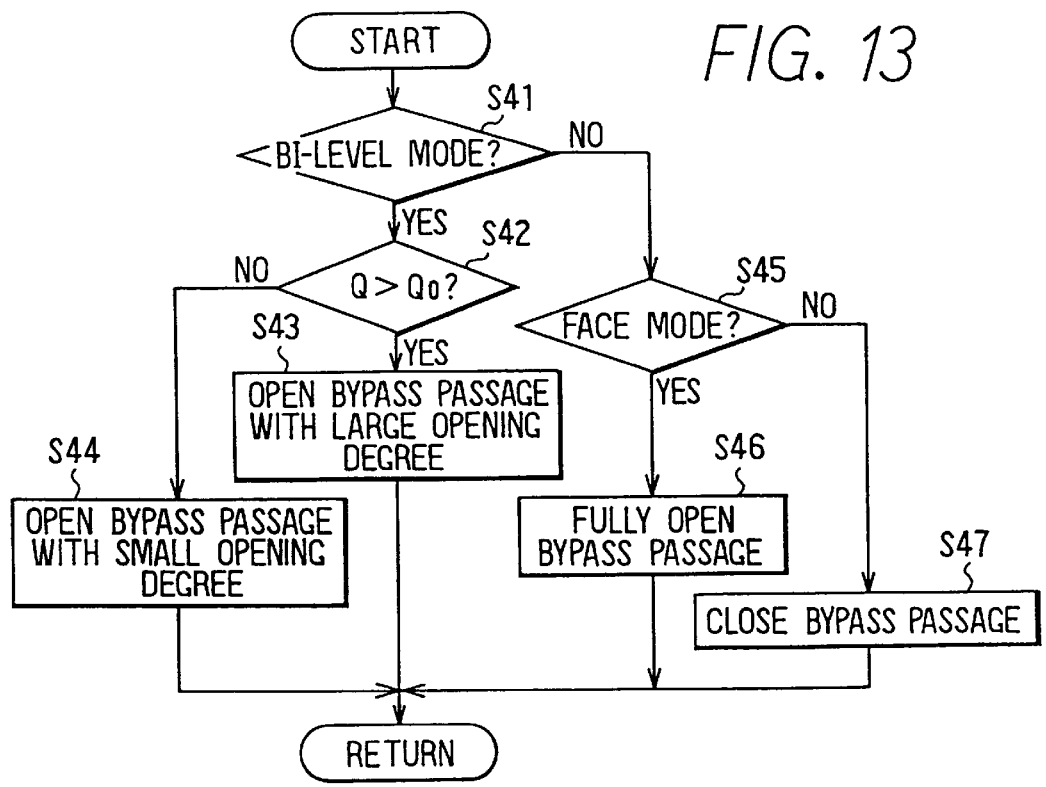
FIG. 13 is a flow chart showing control processes corresponding to FIG. 12, according to a second preferred embodiment of the present invention.
Figure 14:
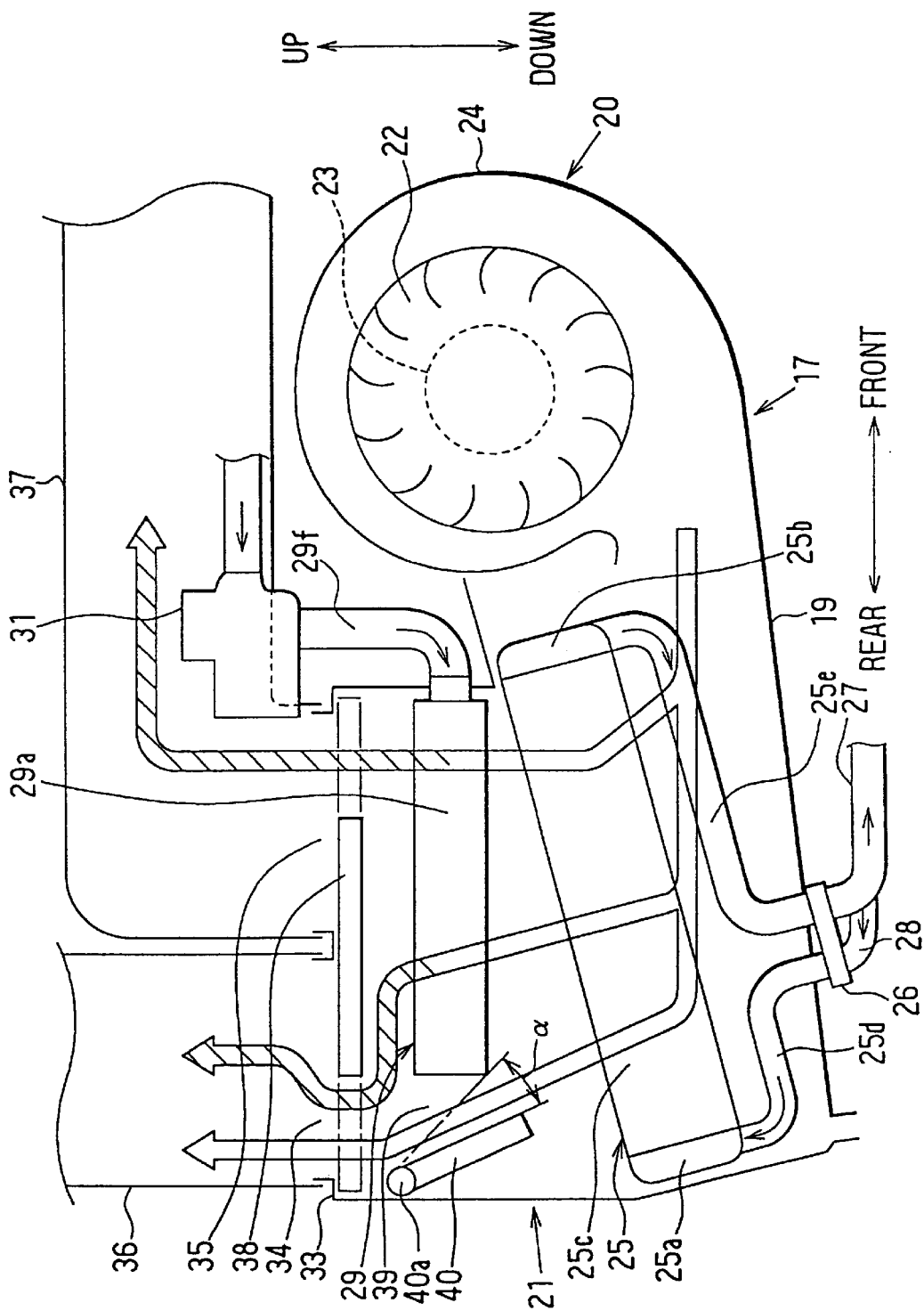
FIG. 14 is a schematic vertical-sectional view showing a rear air-conditioning unit during a bi-level mode according to the second embodiment.

At step S42 in FIG. 13, when the sunlight amount Q is less than the predetermined amount $Q_0$, the rotation angle α of the cool air bypass door 40 is set at a small value (e.g., 23°) so that the cool air bypass passage 39 is opened by a small opening degree. In the second embodiment, when the rear bi-level mode is set, the cool air bypass door 40 opens the cool air bypass passage 39 based on the determination at step S43 or at step S44. Thus, as shown in FIG. 14, during the rear bi-level mode, air passing through the evaporator 25 and the heater core 29 is blown toward the foot portion of the passenger seated on the rear seat in the passenger compartment from the foot air outlets 37b through the foot opening portion 35 and the foot duct 37, and warm air heated in the heater core 29 and cool air passing through the cool air bypassing passage 39 are mixed and are blown toward the head portion of the passenger seated on the rear seat in the passenger compartment from the face air outlets 36b through the face opening portion 34 and the face duct 36. As a result, the temperature of air blown from the face air outlets 36b of the ceiling portion 36a can be made lower than the temperature of air blown from the foot air outlets 37b of the duct portion 37a; and therefore, a temperature distribution of blown-air, for "cooling head portion and heating foot portion", can be set.

In the second embodiment, when the sunlight amount Q is larger than $Q_0$, the larger the sunlight amount Q is, the larger the opening degree of the cool air bypass passage 39 becomes; and therefore, the temperature of air blown from the face duct 36 is made lower than the temperature of air blown from the foot duct 37. Preferably, the temperature difference of blown-air, between upper and lower sides in the passenger compartment is set in a range of 15° C.–20° C. In the second embodiment, Steps S45–S47 shown in FIG. 13 are similar to those in FIG. 12 of the first embodiment, and the explanation thereof is omitted.

Although the present invention has been fully described in connection with the preferred embodiments thereof with reference to the accompanying drawings, it is to be noted that various changes and modifications will become apparent to those skilled in the art.

For example, in the above-described second embodiment, when the bi-level mode is set in the rear air-conditioning unit 17, the position of the cool air bypass door 40 is controlled in two steps by the comparison result between the sunlight amount Q and the predetermined amount $Q_0$. However, during the bi-level mode of the rear air-conditioning unit 17, the position of the cool air bypass door 40 can be set at a predetermined position so that the opening degree of the cool air bypass passage 39 is always set at a set value. The opening degree of the cool air bypass passage 39 may be controlled linearly according to the sunlight amount Q. Further, the opening degree of cool air bypass passage 39 may be controlled so that the temperature difference of blown-air, between upper and lower sides in the passenger compartment, is set in the range of 15° C.–20° C.

In the above-described embodiments, the duct portion 37a of the foot duct 37 is disposed at an upper side of the floor board 11. However, the duct portion 37a of the foot duct 37 may be disposed at a lower side of the floor board 11 to prevent the duct portion 37a of the foot duct 37 from protruding from the floor board 11. Further, the present invention may be applied to a rear air-conditioning unit which is manually controlled.

In the above-described embodiments, the present invention is applied to an air conditioning apparatus for the one-box type recreational vehicle (RV); however, the present invention may be applied to an air conditioning apparatus for a vehicle having a front air-conditioning unit and a rear air conditioning unit.

In the above-described embodiments, only the evaporator 25 of the rear air-conditioning unit 17 is inclined by a small angle θ relative to the horizontal direction. However, the heater core 29 may be also inclined by a small angle relative to the horizontal direction. As an experimental result by the inventors of the present invention, it is preferable that each inclined angle of the evaporator 25 and the heater core 29 is set to be lower than 40°.

Such changes and modifications are to be understood as being within the scope of the present invention as defined by the appended claims.

What is claimed is:

1. An air conditioning apparatus for a vehicle having a passenger compartment, said air conditioning apparatus comprising:

a rear air-conditioning unit for controlling a temperature of air blown toward a rear seat side in the passenger compartment, wherein:
    said rear air-conditioning unit includes
        a rear case for forming a rear air passage, said rear case having a rear opening portion for blowing air toward the rear seat side in the passenger compartment,
        a rear blower unit for blowing air into said rear air passage,
        a rear cooling heat exchanger for cooling air flowing through said rear air passage,
        a rear heating heat exchanger for heating air having passed through said rear cooling heat exchanger by performing heat-exchange between air and hot water flowing therethrough,
        a flow control valve for adjusting a flow rate of hot water flowing into said rear heating heat exchanger, and
        a rear mode switching door which slides and reciprocates approximately horizontally to open and close said rear opening portion;
    said rear cooling heat exchanger is disposed approximately horizontally in said rear case;
    said rear heating heat exchanger is disposed at an upper side of said rear cooling heat exchanger approximately horizontally in said rear case; and
    said rear opening portion is provided at an upper side of said rear heating heat exchange; wherein
    said rear heating heat exchanger includes an inlet tank and an outlet tank which are disposed to form a predetermined distance therebetween, and a plurality of tubes which are disposed between said inlet tank and said outlet tank in parallel with each other;
    said rear heating heat exchanger is a one-way type in which hot water flows from said inlet tank toward said outlet tank through said tubes in one way;
    said rear opening portion includes a rear face opening for blowing air toward an upper portion at the rear seat side in the passenger compartment, and a rear foot opening for blowing air toward a lower portion at the rear seat side in the passenger compartment; and
    said rear face opening and said rear foot opening are provided at a downstream air side of said rear heating heat exchanger, and are positioned to be adjacent to each other in a direction perpendicular to a longitudinal direction of said tubes of said rear heating heat exchanger.

2. The air conditioning apparatus according to claim 1, wherein:
    said rear heating heat exchanger is disposed in said rear case to form a rear cool air passage through which air having passed through said rear cooling heat exchanger bypasses said rear heating heat exchanger;
    said rear cool air passage is provided at a side of said rear face opening; and
    a predetermined amount of air from said rear cool air passage is introduced into said rear face opening, during a rear bi-level mode where air is blown from both of said rear face opening and said rear foot opening.

3. The air conditioning apparatus according to claim 1, wherein:

said rear air-conditioning unit further includes an adjustment member for adjusting an opening degree of said rear cool air passage; and said adjustment member adjusts the opening degree of said rear cool air passage to adjust an amount of air flowing from said rear cool air passage into said rear face opening, during said rear bi-level mode.

4. The air conditioning apparatus according to claim 1, said rear case is positioned under a floor board in the passenger compartment.

5. The air conditioning apparatus according to claim 1, wherein said rear heating heat exchanger is disposed approximately in parallel with a horizontal direction of the vehicle.

6. The air conditioning apparatus according to claim 5, wherein:

said inlet tank and said outlet tank of said rear heating heat exchanger are disposed to be approximately parallel to a front-rear direction of the vehicle;

said rear air-conditioning unit further includes hot water pipes for supplying hot water to said inlet tank of said rear heating heat exchanger and for discharging hot water from said outlet tank of said rear heating heat exchanger; and said hot water pipes are respectively connected to said inlet tank and said outlet tank of said rear heating heat exchanger within a dimension range of said rear heating heat exchanger in a width direction of the vehicle.

7. The air conditioning apparatus according to claim 1, wherein said rear cooling heat exchanger is disposed in said rear case to be approximately parallel to a horizontal direction of the vehicle.

8. The air conditioning apparatus according to claim 1, wherein said rear face opening and said rear foot opening are provided in said rear case at an upper side of said rear heating heat exchanger to be adjacent to each other approximately in a width direction of the vehicle.

9. A rear air-conditioning unit for a vehicle, for controlling a temperature of air blown toward a rear seat side in a passenger compartment of the vehicle, said rear air-conditioning unit comprising:

a rear case for forming a rear air passage, which has an air suction port, for introducing air therein, at one end side thereof, and a rear face opening and a rear foot opening at the other end side thereof, a rear blower unit for blowing air introduced from said air suction port to said rear face opening and said rear foot opening;

a rear heating heat exchanger, disposed in said rear case, for heating air passing therethrough by performing heat-exchange between air and hot water flowing therethrough;

a flow control valve for adjusting a flow rate of hot water flowing into said rear heating heat exchanger to control heating capacity of said rear heating heat exchanger;

a rear face duct, connected to said rear face opening, for blowing air toward an upper portion at the rear seat side in the passenger compartment; and a rear foot duct, connected to said rear foot opening, for blowing air toward a lower portion at the rear seat side in the passenger compartment, wherein:

said rear heating heat exchanger includes an inlet tank and an outlet tank which are disposed to form a predetermined distance therebetween, and a plurality of tubes which are disposed between said inlet tank and said outlet tank in parallel with each other;

said rear heating heat exchanger is a one-way type in which hot water flows from said inlet tank toward said outlet tank through said tubes in one way; and said rear face opening and said rear foot opening are provided at a downstream air side of said rear heating heat exchanger, and are positioned to be adjacent to each other in a direction perpendicular to a longitudinal direction of said tubes of said rear heating heat exchanger.

* * * * *

UNITED STATES PATENT AND TRADEMARK OFFICE
CERTIFICATE OF CORRECTION

PATENT NO : 6,131,652
DATED : October 17, 2000
INVENTOR(S) : Koichi Ito et al

It is certified that error appears in the above-identified patent and that said Letters Patent is hereby corrected as shown below:

Title page, [75] Inventors:
 delete "Hikaru Sugi, Nagoya; Takashi Toyoshima; Kariya"

Signed and Sealed this

Twenty-second Day of May, 2001

*Attest:*

NICHOLAS P. GODICI

*Attesting Officer*   *Acting Director of the United States Patent and Trademark Office*